Nov. 17, 1936.   C. HOLTZ   2,061,074
JAR HOLDING DEVICE
Original Filed Oct. 16, 1933
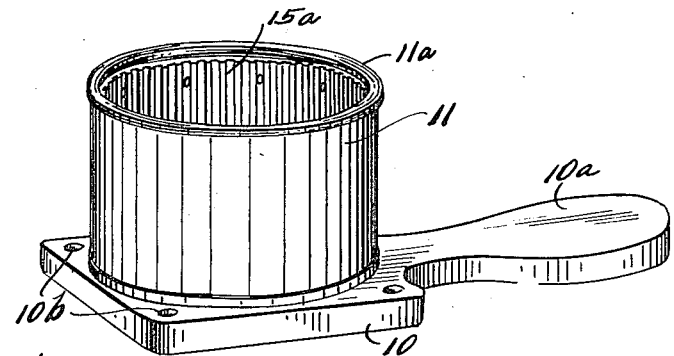
Fig. 1.
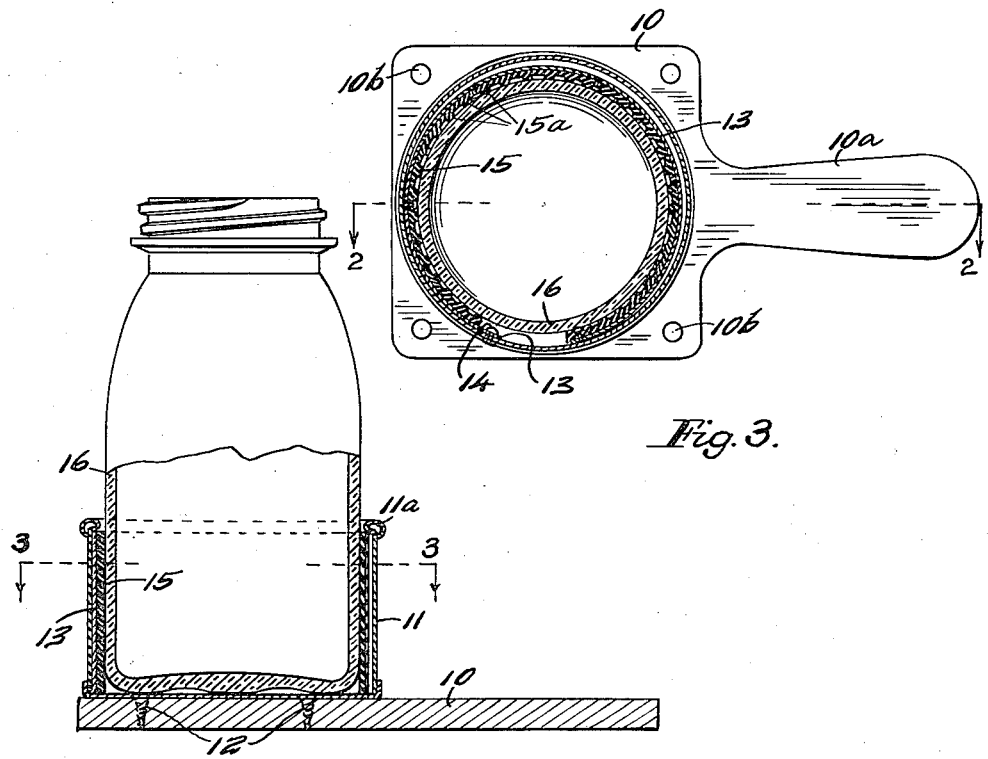
Fig. 3.
Fig. 2.
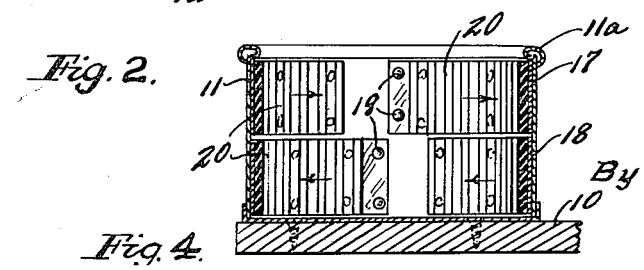
Fig. 4.
Inventor
CHARLES HOLTZ
By Chas. C. Reif
Attorney Patented Nov. 17, 1936

2,061,074

UNITED STATES PATENT OFFICE 2,061,074

JAR HOLDING DEVICE

Charles Holtz, deceased, late of Minneapolis, Minn., by Lillian Holtz executrix, Minneapolis, Minn.

Substitute for application Serial No. 693,789, October 16, 1933. This application July 20, 1936, Serial No. 91,572

9 Claims. (Cl. 81—3.3)

This invention relates to a device for holding a fruit jar, bottle or other cylindrical object against rotation about its axis. While the device may have various applications, it particularly is designed for holding fruit jars against rotation when the tops are placed thereon. The most commonly used type of jar has a cover which is screwed thereon, threads being provided at the top or neck of the jar to receive this cover. It is necessary to screw the cover down tight in order to seal the jar and the cover is usually screwed down onto or against a rubber gasket or washer which is placed about the top of the jar. Difficulty is often experienced in holding the jar in order to securely screw the top thereon.

It is an object of this invention to provide a simple and efficient device for receiving the jar and holding the same against rotation.

It is a further object of the invention to provide a device having a flexible strip of a length to extend a substantial distance about the periphery of the jar, said strip being secured at one point and having a frictional surface adapted to engage the periphery of the jar, whereby when the jar is placed therein and rotated said strip wraps about the jar, binds thereon and prevents rotation of said jar.

It is a further object of the invention to provide a device comprising a casing preferably of cylindrical form having an open upper end, a strip of material extending about the wall of said casing and secured thereto at one point, said strip being otherwise free and having a free end and also having an inner frictional surface whereby when the jar is placed therein and rotated longitudinally of said strip from the point where it is secured toward said free end, it will bind on said jar and prevent rotation thereof.

It is another object of the invention to provide a device such as set forth in the preceding paragraph, said casing being secured to a member adapted to be held against rotation.

These and other objects and advantages of the invention will be fully set forth in the following description made in connection with the accompanying drawing, in whcih like reference characters refer to similar parts throughout the several views and in which:—

Fig. 1 is a perspective view of the device;

Fig. 2 is a vertical section taken on line 2—2 of Fig. 3 as indicated by the arrows;

Fig. 3 is a horizontal section taken on line 3—3 of Fig. 2 as indicated by the arrows; and Fig. 4 is a partial view similar to Fig. 2 showing a modification.

Referring to the drawing, a device is shown comprising a base member 10. While this base member may take various forms, in the embodiment of the invention it is illustrated as in the form of a plate or board of rectangular form in plan, the same having a handle portion 10a extending at one side thereof. Said base 10 is also provided with a plurality of holes 10b extending therethrough adjacent the corners thereof adapted to receive screws to hold the same on a table or other support. A casing 11 is provided and while this might be of different forms, in the embodiment of the invention illustrated, it is shown as cylindrical in form having a bottom portion secured to the top of base 10 by screws 12, said casing extending upwardly from the base having an open upper end, the upper edge thereof shown as provided with a bead 11a. Extending quite a distance about the inner wall of casing 11 is a strip 13 of stiff but flexible material, the same being secured at one point and as illustrated adjacent one end of the wall of casing 11 by rivets 14. While member 13 may be made of different materials, in practice it has been found very suitable to make the same of thin sheet metal having considerable resiliency. A layer of frictional material 15, such as rubber, is secured to the inner side of strip 13, this layer being shown as having vertically extending corrugations or ribs 15a. Members 13 and 15 extend about the inner wall of casing 11 and are adapted to receive the lower end of the jar 16 so that the inner surface of member 15 is in close proximity thereto.

When the jar 16 is so placed and the same is rotated longitudinally of members 13 and 15 from the point where they are secured towards the free ends thereof, member 15 binds on the jar and is thus carried around by the jar at its free end. In other words, it wraps around the jar and is thus pulled into close engagement therewith. As strip 13 is fastened at one end, the rotative movement of the jar 16 with members 13 and 15 is quite limited and the rotation is soon positively stopped by member 15 binding on the jar. To release the jar it is merely turned slightly in the opposite direction which causes members 13 and 15 to expand radially and move out against the inner wall of casing 11 so that the jar can readily be lifted out of casing 11. The base member 10 can be held by the handle 10a by one hand of the operator and the other hand can be used to screw on the cover of the jar. Assurance is thus given that the jar will be held positively while the cover is being screwed on and the hands of the operator are not in any hazardous position. In many cases the jars are quite hot and the present device forms a convenient and comfortable means for holding the jars.

In Fig. 4 a modification is shown in which the base 10 and casing 11 are provided as already described. In place, however, of just one strip 13 and covering 15, upper and lower strips 17 and 18 are provided similar to strip 13 but of less width. Strips 17 and 18 are secured at one point to the wall of casing 11 by rivets 19. Each strip 17 and 18 has secured thereto a corrugated layer of frictional material 20 similar to the layer 15. One strip 17 and its covering extends in one direction about the inner wall of casing 11 from its rivets 19 while the other strip 18 and its covering extends in the opposite direction about the wall of casing 11 from its rivets 19.

In operation of the device shown in Fig. 4, it will be seen that the jar or other cylindrical object used can be held from rotation in either direction. If it is moved in a clockwise direction members 17 and 20 will bind thereon and hold it from rotation while if it is moved in a counter-clockwise direction, member 18 and its covering will bind thereon and hold it from rotation. When members 17 and 18 are in normal position, the jar can readily be placed therein and lifted therefrom.

From the above description it is seen that applicant has provided a very simple and efficient device for holding a jar or other cylindrical object against rotation about its axis. The jar is quite positively held and is held in a very convenient manner. The device is quite simple in construction, comprises very few parts and can be made quite durable. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

This application is a substitute for application of Charles Holtz, for "Jar holding device", filed October 16, 1933, S. N. 693,789, now abandoned.

What is claimed is:—

1. A device for holding a cylindrical object from rotation about its axis having in combination, a casing, a flexible member having a frictional surface secured at one point to the inner wall of said casing and having a free end therein, said member extending loosely about the wall of said casing and adapted to receive said object and have its frictional surface in close proximity thereto to automatically grip the cylindrical surface of said object when the same is rotated substantially on its axis and longitudinally of said member in a direction from said point toward said free end.

2. A device for holding a cylindrical object from rotation about its axis having in combination, a casing, a base adapted to be held from rotation to which said casing is secured, a strip of flexible material of considerable width and of a length sufficient to extend a substantial distance about said object secured at one point to the inner wall of said casing, extending about said wall and having a free end in said casing spaced from said point less than 360 degrees, the same having an inner frictional surface and being adapted to receive said object with its frictional surface adjacent the periphery of said object whereby said strip will wrap about said object and bind thereon when said object is rotated to move its periphery from said point toward said free end to prevent rotation of said object toward said free end.

3. A device for holding a jar from rotation about its longitudinal axis having in combination, a base member adapted to be held against rotation, a substantially cylindrical casing secured thereto at its lower end extending upwardly from said base and having an open upper end, a strip of flexible material of appreciable width secured to the inner wall of said casing at one point disposed loosely about the wall of said casing and having a free end therein located less than 360 degrees circumferentially from said point, said strip being of a length to extend a substantial distance around said jar and having an inner frictional surface arranged to be disposed in close proximity to said jar whereby when said jar is placed therein and rotated longitudinally of said strip in a direction from said point toward said free end, the same will grip said jar and prevent rotation thereof.

4. A device for holding a cylindrical object against rotation about its axis comprising a flexible means adapted to extend a substantial distance about the periphery of said object, the same having a frictional surface of considerable width adapted to engage said periphery, said means having a free end and being fixed at one point some distance from said end, a member to which said means is secured at said point having means secured thereto adapted to prevent rotation of said first mentioned member whereby when said object is engaged by said flexible means and rotated along the length of said means from said fixed point to said free end, said means will automatically bind on said object and prevent rotation thereof.

5. A device for preventing rotation of a cylindrical jar having in combination, a base member having a handle portion adapted to be grasped to prevent rotation of said base member, a casing extending upwardly from said base member and secured thereto, a flexible strip extending loosely about the inner wall of said casing having a free end therein and secured at one point to said wall, said strip having a frictional surface at its inner side and being adapted to receive said jar and engage the same with said frictional surface whereby when said jar is rotated to move its periphery from said point to said end, said strip will automaticaly wrap about said jar and bind thereon and hold the same against rotation.

6. A device for holding a cylindrical object from rotation about its vertical axis having in combination, a pair of flexible frictional strips, a member to which each of said strips is secured at one point, one strip extending in one direction to a free end thereof and the other strip extending in the opposite direction to a free end thereof, said strips extending in semi-cylindrical formation and having inner frictional surfaces whereby when said object is placed therein and rotated longitudinally of one of said strips from the point where it is secured toward said free end thereof said strip will engage the periphery of said object and bind thereon preventing rotation of said object.

7. A device for preventing rotation of a cylindrical object about its axis having in combination, a casing having an open upper end, a pair of flexible members secured to the inner wall of said casing and extending about the wall thereof, each secured at one point to said wall and each having a free end, one of said members extending in one direction from said point to its free end and the other extending from said point in the opposite direction to its free end, said members having inner frictional surfaces adapted to engage the periphery of said object whereby when said object is placed therein and rotated longitudinally of said members from the point where it is secured toward its free end, said members will bind on said object and prevent rotation thereof.

8. A device for holding a jar against rotation having in combination, a base member, a casing secured to said base member and upstanding therefrom having an open upper end, a strip of stiff flexible material extending about the inner wall of said casing secured to said wall at one point and having a free end, a layer of frictional material secured to the inner side of said strip and adapted to receive and engage said object whereby when said object is placed therein and rotated longitudinally of said strip from the point where it is secured toward its free end, said strip will wrap about said object, bind thereon and prevent rotation thereof.

9. A device for holding a substantially cylindrical object from rotation about its axis having in combination, a substantially cylindrical casing, a flexible member having a frictional surface of considerable extent and having one end fixed and extending around the inner wall of said casing loosely, said member being free except at said fixed end, said member being adapted to receive said object and have its frictional surface in close proximity to the periphery of said object whereby when said object is rotated to move said periphery in a direction from said fixed end to the free end of said member, said member will automatically grip said object and prevent rotation thereof.

LILLIAN HOLTZ,
*Executrix of the Estate of Charles Holtz, deceased.*